United States Patent [19]

Shimizu et al.

[11] Patent Number: 4,984,822
[45] Date of Patent: Jan. 15, 1991

[54] ADJUSTABLE VEHICLE SEAT FOR USE WITH A PASSIVE SEAT BELT

[75] Inventors: Kenzo Shimizu, Yoksuka; Shizuo Ogata, Zama, both of Japan

[73] Assignee: Nissan Motor Company, Limited, Japan

[21] Appl. No.: 374,825

[22] Filed: Jul. 3, 1989

[30] Foreign Application Priority Data

Jul. 12, 1988 [JP] Japan .............................. 63-91392[U]

[51] Int. Cl.$^5$ .......................... B60N 1/10; B60R 21/08
[52] U.S. Cl. .................................. 280/804; 296/65.1; 297/483
[58] Field of Search ...................... 280/804, 805, 807; 297/475, 478, 483, 64, 66; 296/65.1

[56] References Cited

U.S. PATENT DOCUMENTS

| | | | |
|---|---|---|---|
| 3,829,123 | 8/1974 | Holka | 280/808 |
| 4,317,584 | 3/1982 | Takata | 280/804 |
| 4,465,302 | 8/1984 | Mixi et al. | 280/804 |
| 4,541,667 | 9/1985 | Ebihara et al. | 297/64 |
| 4,790,405 | 12/1988 | Kataoka | 280/804 |

Primary Examiner—Richard A. Bertsch
Attorney, Agent, or Firm—Leydig, Voit & Mayer

[57] ABSTRACT

An adjustable vehicle seat for use with a passive seat belt has a seat cushion having a joining portion and a seat back having a joining portion at which it is pivotally supported on the joining portion of the seat cushion. A clearance is provided between the joining portions of the seat back and seat cushion for preventing the webbing from being held compressedly between the joining portions when the seat back is in a forwardly turned position.

6 Claims, 3 Drawing Sheets

ADJUSTABLE VEHICLE SEAT FOR USE WITH A PASSIVE SEAT BELT

BACKGROUND OF THE INVENTION

1. Field of the Invention

The present invention relates to an adjustable vehicle seat for use with a passive seat belt.

2. Description of the Prior Art

FIG. 2 shows an arrangement including an adjustable vehicle seat and a three-point passive seat belt for an occupant of the seat. FIGS. 3 and 4 show a prior art adjustable front seat which can be employed in the arrangement of FIG. 2. The seat includes a seat back 101 and a seat cushion 103. The seat back 101 is swingably or pivotally installed at the lower end joining portion on the rear end joining portion of the seat cushion 103. The seat cushion 103 is slidably installed by way of a seat slide rail 113 on a vehicle floor 115.

A retractor 105 is arranged on the inboard side of the seat at the junction of the seat back 101 and seat cushion 103 and is installed on a bracket 107. The bracket 107 is in turn secured by way of a bracket 109 and with bolts 111 to a seat slide rail 113. The retractor 105 and brackets 107, 109 are covered by a trim member 117 to improve the appearance. An end of a webbing (shoulder webbing) 119 is rolled up by the retractor 105. In this connection, description is made only of the shoulder webbing for brevity though the webbing 119 further includes a lap webbing. The other end of the webbing 119 is connected to a slider 121. The slider 121 is installed in a guide rail 123 and slidable along the same. The guide rail 123 is installed on a vehicle body and extends along an edge of an opening 127 which is opened and closed by a door 125. The slider 121 is adapted to be driven by a motor (not shown) rearwardly into a seat occupant restraining position "DC" as indicated by the solid lines and forwardly into a seat occupant liberating position "DO" as indicated by the two-dot chain lines in FIG. 2.

A problem of the above described prior art arrangement is that the shoulder webbing 119 is liable to be inserted between the joining portions of the seat back 101 and seat cushion 103 and held tightly or compressedly between them to obstruct the movement of the slider 121. By experiments conducted by the applicants, it was found that the problem results from the fact that the seat back 101 in a forwardly inclined position is pressed at a lower end portion 31 upon the seat cushion 103.

If the webbing 119 is held compressedly between the joining portions of the seat back 101 and seat cushion 103, the slider 121 may become slower in movement or in some cases may stop moving half way to a predetermined position. For example, when the seat back 101 is in a forwardly inclined position and the door 125 is opened in order that a rear seat occupant can get out of a two-door vehicle, the webbing 119 may possibly be inserted between the joining portions of the seat back 101 and seat cushion 103. The door 125 may then be closed with the seat back 101 placed in a forwardly inclined o position. When the above is the case, the slider 121 which is driven automatically rearward in response to closure of the door 125 stops moving half way to the seat occupant restraining position since the shoulder webbing 119 is caught between the seat back 101 and seat cushion 103. Under this condition, the shoulder webbing 119 may partially extend behind the seat back 101 to make it impossible for the driver to turn the seat back (front passenger) 101 rearward into an upright or rearwarly inclined position.

SUMMARY OF THE INVENTION

In accordance with the present invention, there is provided an improved vehicle seat for use with a passive seat belt. The passive seat belt includes a guide rail arranged along an upper edge of an opening which is opened and closed by a door, a slider installed in the guide rail and movable along the guide rail, a retractor arranged on the inboard side of the seat and a webbing having an end attached to the slider and the other end rolled up by the retractor.

The seat comprises a seat cushion having a joining portion, a seat back having a joining portion at which it is pivotally supported on the joining portion of the seat cushion, and means for defining a clearance between the joining portions of the seat back and seat cushion for preventing the webbing from being held between the joining portions when the seat back is in a forwardly turned position.

This structure is effective for solving the above noted problem inherent in the prior art device.

It is accordingly an object of the present invention to provide an adjustable vehicle seat for use with a passive seat belt which can reliably prevent a shoulder webbing of the seat belt from being held or caught between a seat back and seat cushion.

DESCRIPTION OF THE PREFERRED EMBODIMENT

Figure 1:
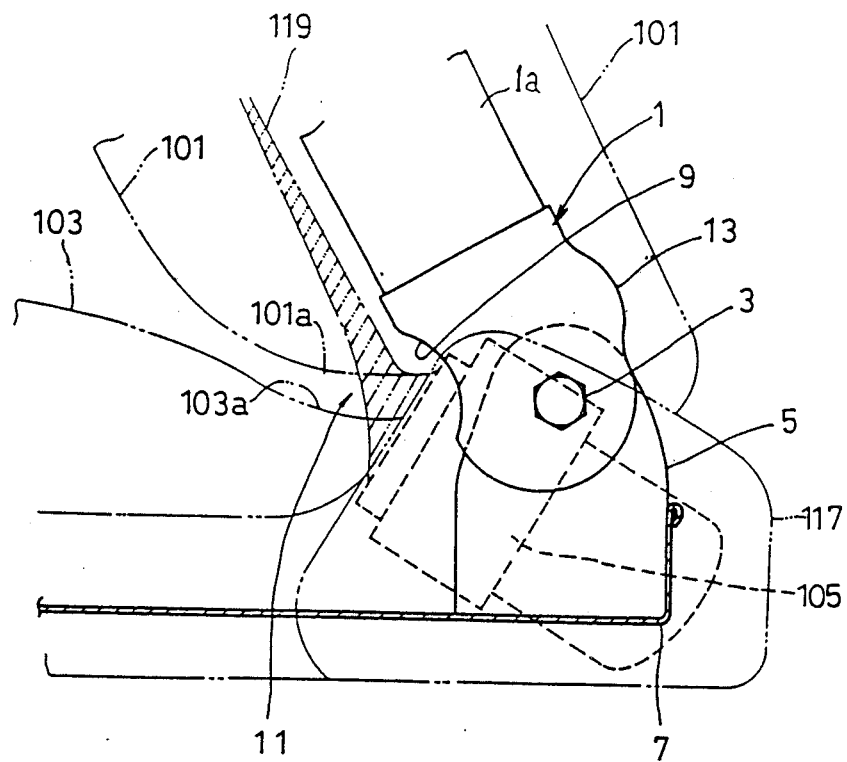
FIG. 1 is a fragmentary side elevational view of an adjustable vehicle seat according to an embodiment of the present invention.
Figure 2:
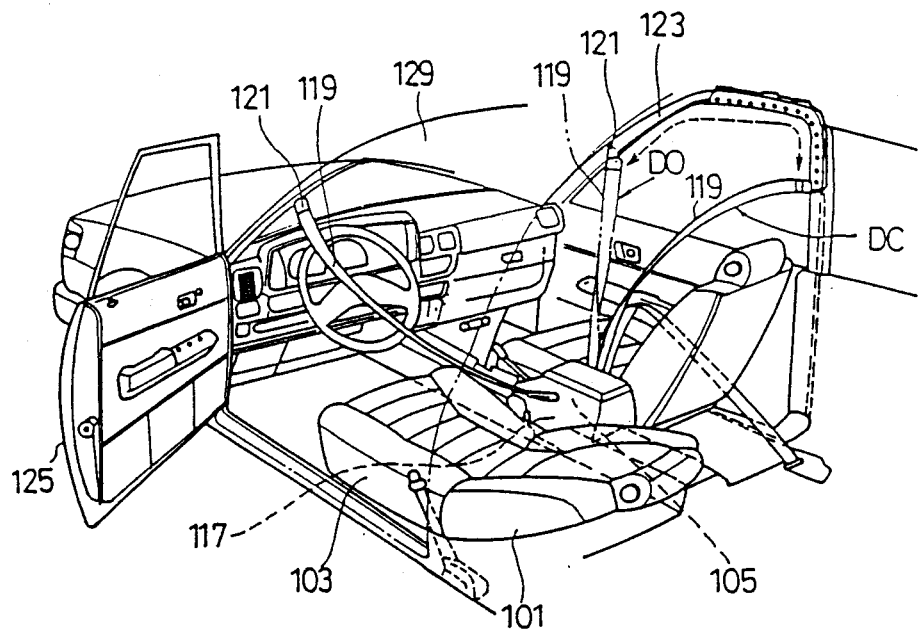
FIG. 2 is a fragmentary perspective view of a vehicle in which the adjustable seat of this invention can be incorporated.
Figure 3:
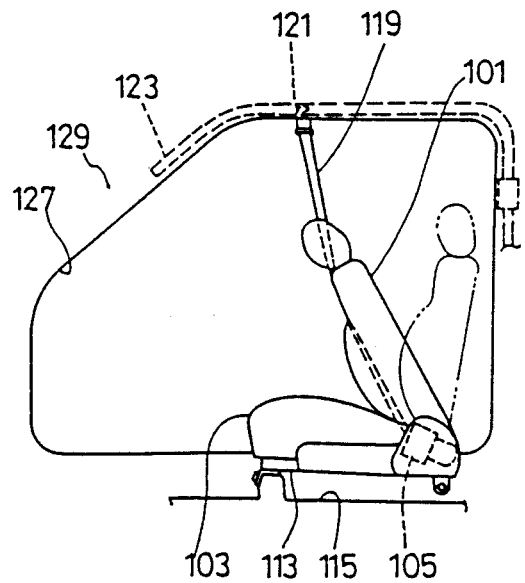
FIG. 3 is a schematic view of a prior art adjustable vehicle seat and its adjacent passive seat belt.
Figure 4:
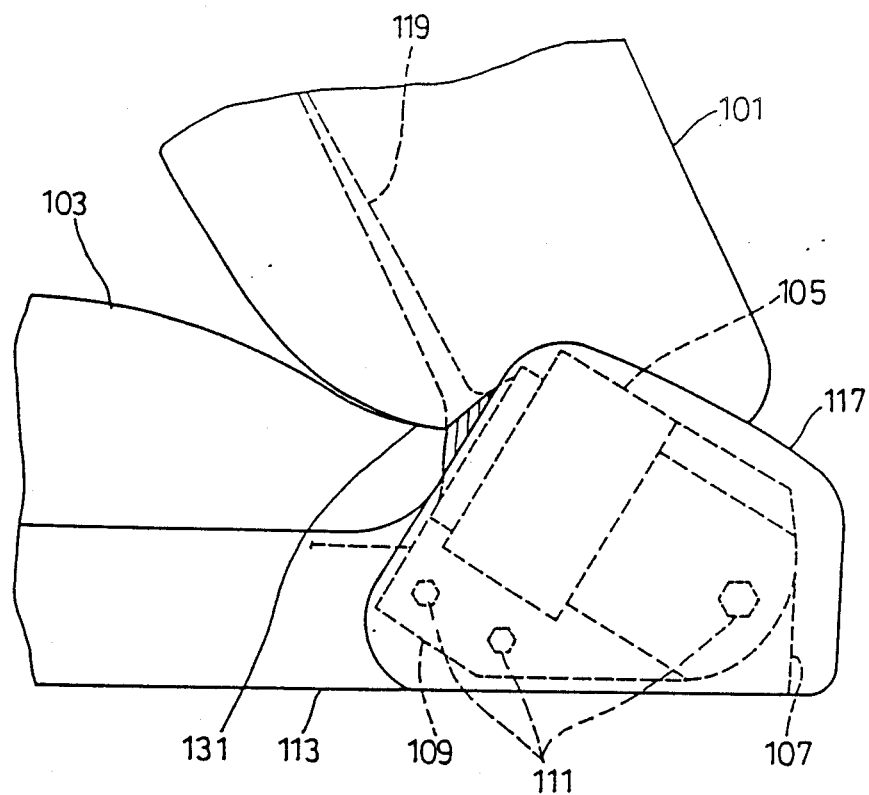
FIG. 4 is a view similar to FIG. 1 but shows the prior art vehicle seat of FIG. 3.

Referring to FIGS. 1 and 2, an adjustable vehicle seat according to an embodiment of the present invention will be described. In FIG. 1, like reference numerals designate like or corresponding parts and portions to those of the arrangement in FIGS. 2-4.

The adjustable vehicle seat of this invention includes a seat back frame 1 which is formed from sheet metal, synthetic resin, pipe or the like and adapted to serve as a framework of a seat back 101 for supporting a cushion member. The seat back frame 1 includes on the inboard side of the seat an upstanding frame member 1a and is supported at a lower end portion of the frame member 1a on a seat cushion bracket 5 by means of a bolt or the like fastening member 3 in such a way as to be swingable or pivotable about the fastening member 3. The seat cushion bracket 5 is attached to a seat cushion frame 7, a framework of a seat cushion 103.

The frame member 1a has a pair of lengthwise edges and is formed with a crescent-like recess 9 at one edge on the side of the seat cushion 103 so that the webbing 119 is reliably prevented from interfering with the frame member 1a. In addition to the recess 9, the seat back 101 and seat cushion 103 are constructed and arranged so that a space or clearance 11 is provided between the joining portions of the seat back 101 and seat cushion 103 even when the seat back 101 is turned forwardly, i.e., turned into a forwardly inclined position. The clearance 11 is large enough so as to prevent the webbing 119 from being held or caught in between the seat back 101 and the seat cushion 101 when the seat back 101 is turned to a forwardly inclined position.

The frame member 1a of the seat back frame 1 is formed with a protrude portion 13 at the edge on the opposite side of the recess 9 in order to increase the strength and thereby compensate for the reduction in strength resulting from the provision of the recess 9.

The operation of the vehicle seat of this invention will now be described. Firstly, it is assumed that the seat back 101 is in a forwardly inclined position with the webbing 119 being held in a taut state between the slider 121 and the retractor 105. This condition is attained when, for example, a luggage is to be taken out from the rear seat through the front passenger seat. In this instance, since the clearance 11 is provided between the joining portions of the seat back 101 and seat cushion 103 and the frame member 1a of the seat back frame 1 is recessed so as not to interfere with the webbing 119 when the seat back 101 is in a forwardly inclined position, the webbing 119 is reliably prevented from being held or caught in between the seat back 101 and the seat cushion 103. Accordingly, there is no obstacle to the movement of the slider 121 or any restraint that reduces the speed of movement of the slider 121. When the front door 125 on the passsenger side is closed, the driver thus can turn the seat back 101 to an upright or rearwardly inclined position with ease since it is assured that the slider 121 can move smoothly along the guide rail 123 to a predetermined rearward position, i.e., a seat occupant restraining position.

From the foregoing, it will be understood that since the clearance 11 is provided between the joining portions of the seat back 101 and seat cushion 103 when the seat back 101 is in the forwardly inclined position, the webbing 119 is reliably prevented from being held between the seat back 101 and seat cushion 103, obstacle to the movement of the slider 121.

It will be further understood that the vehicle seat of this invention makes it possible to turn the seat back 101 from the forwardly inclinded position to the upright or rearwardly inclined position with ease since it is assured that the slider 121 moves smoothly to the rearward position in response to the closure of the associated door 125.

Since the frame member 1a of the seat back frame 1 is formed with the protrusion 13 on the opposite edge of the frame 1 from the recess 9, the strength of the seat back frame 1 is not reduced at all.

It will be further understood that the cushion member at the joining portion of the seat back 101 can be thick in the place provided with the recess 9, so a seat occupant does not have an uncomfortable feel from the contact of his or her hip with the lower end joining portion of the seat back 101.

What is claimed is:

1. In a vehicle having an adjustable seat and a passive seat belt for an occupant of said seat, said passive seat belt including a guide rail arranged along an upper edge of an opening which is opened and closed by a vehicle door outboard of said seat, a slider installed in said guide rail and movable along said guide rail, a retractor disposed inboard of said seat, and webbing having a first end attached to said slider and a second end rolled up by said retractor, said seat comprising a seat cushion having a first joining portion;
 a seat back having a second joining portion at which it is pivotally supported on said first joining portion of said seat cushion; and
 means for defining a clearance between said cushion and seat back for preventing said webbing from being held between said cushion and seat back when said seat back is in a forwardly pivoted position.

2. The seat belt and seat arrangement as set forth in claim 1 wherein said seat back comprises a seat back frame having a frame member on the inboard side of the seat and said means for defining a clearance comprises a recess formed in said frame member so that said seat back frame is prevented from interfering with said webbing.

3. The seat belt and seat arrangement as set forth in claim 1 wherein said frame member includes a protrusion opposite said recess.

4. A seat arrangement as set forth in claim 1 wherein the retractor is disposed adjacent said first and second joining portions.

5. A seat arrangement for a vehicle comprising:
 a seat cushion having inboard and outboard sides;
 a seat back;
 mounting means for pivotally mounting the seat back on the seat cushion for movement between an upright position and a forwardly tilted position in which the seat back is separated from the seat cushion by a gap;
 a guide rail disposed on one side of the seat cushion;
 a retractor disposed adjacent the seat cushion on the opposite side from the guide rail; and
 webbing having a first end connected to the retractor and a second end slidably connected to the guide rail, the webbing passing loosely through the gap between the seat cushion and the seat back when the seat back is in its forwardly tilted position.

6. A seat arrangement as claimed in claim 5 wherein the mounting means comprises a frame secured to the seat back and pivotally connected to the seat cushion and having a recess formed therein, the webbing passing loosely between the recess and the seat cushion when the seat back is in its forwardly tilted position.

* * * * *